UNITED STATES PATENT OFFICE.

PROSPER MONNET, OF LYONS, FRANCE.

IMPROVEMENT IN THE MANUFACTURE OF ANILINE COLORS.

Specification forming part of Letters Patent No. 36,357, dated September 2, 1862.

*To all whom it may concern:*

Be it known that I, PROSPER MONNET, of Lyons, in the Empire of France, have invented a new and Improved Process for Producing Red, Blue, and Purple Colors of Aniline, &c.; and I do hereby declare that the following is a full, clear, and exact description of the same.

This invention consists in treating salts of aniline or toluidine—such as the hydrochlorate of these substances—with nitro-benzine at a boiling temperature, and separating the red and blue colors by washing with pure water.

To enable those skilled in the art to fully understand and use my invention, I will proceed to describe it.

Nitro-benzine when heated to the boiling temperature, and mixed with the salts of aniline or toluidine, is capable of furnishing two coloring-matters—one red and the other blue—which, when mixed, give a third color, the purple, the shades of which can be changed at pleasure by altering the proportions in which the red and blue are mixed. This last color is also obtained if the red and blue are not completely separated. For instance, one part of nitro-benzine of good quality—such as prepared for commercial purposes—is mixed with two parts of hydrochlorate of aniline or of toluidine in pieces. This hydrochlorate is obtained by saturating aniline or toluidine with hydrochloric gas. If the mixture is kept at the boiling temperature, it colors rapidly to a beautiful deep blue, which, toward the end of the operation, assumes a slight tinge of purple. Five or six hours of light boiling are sufficient to complete the reaction. Instead of the hydrochlorate of aniline or toluidine, any other salt—such as acetate or oxalate of aniline or toluidine—can be treated with nitro-benzine with slight changes in the proportions, and the result will be the same. The product thus obtained is washed repeatedly with cold water until the water used for this purpose appears of a pure red color. In order to extract the red, it is necessary to boil the crude product several times with pure water, and each time after filtering and cooling the red precipitates in green flakes or powder. That portion which is insoluble in water constitutes the crude blue color. This blue is desiccated and pulverized, and afterward repeatedly washed with oil of naphtha. If the red color has not been completely extracted, instead of blue a purple color is obtained. If the blue is not sufficiently pure, it is dissolved in alcohol and filtered and precipitated with a solution of saline water. The blue color is then collected on the filter, and it constitutes a paste ready to be delivered for industrial purposes.

Having thus fully described my invention, what I claim as new, and desire to secure by Letters Patent, is—

The within-described process of treating the hydrochlorates or other salts of aniline or toluidine with nitro-benzine, substantially in the manner and for the purposes specified.

PROSPER MONNET.

Witnesses:
LOUIS WM. VIOLLIER,
N. MONNET.